United States Patent [19]
Moir et al.

[11] Patent Number: 5,949,613
[45] Date of Patent: Sep. 7, 1999

[54] DISK DRIVE SPINDLE MOTOR ASSEMBLY WITH STATOR HAVING A RESILIENT COVERING WITH A ROUTING MEANS, AN ATTACHING MEANS AND A CONNECTING MEANS TO OPERATIVELY CONNECT STATOR TO A BASE

[75] Inventors: Michael Bruce Moir, Newbury Park; Richard Gene Krum, Thousand Oaks; John Charles Dunfield, Santa Cruz; Gregory James Blanchette, Scotts Valley, all of Calif.

[73] Assignee: Seagate Technology, Inc., Scotts Valley, Calif.

[21] Appl. No.: 08/767,709

[22] Filed: Dec. 17, 1996

Related U.S. Application Data

[60] Provisional application No. 60/008,750, Dec. 18, 1995.

[51] Int. Cl.[6] .......................... G11B 17/02; H02K 11/00
[52] U.S. Cl. .......................................... 360/99.08; 310/71
[58] Field of Search ............................. 360/98.07, 99.04, 360/99.08; 310/71, 67 R

[56] References Cited

U.S. PATENT DOCUMENTS

| | | | |
|---|---|---|---|
| 5,481,144 | 1/1996 | Dunfield et al. | 360/99.08 |
| 5,572,384 | 11/1996 | Kumagai et al. | 360/99.08 |
| 5,659,213 | 8/1997 | Imashiro et al. | 360/99.08 |
| 5,694,268 | 12/1997 | Dunfield et al. | 360/99.08 |

*Primary Examiner*—Stuart S. Levy
*Assistant Examiner*—George J. Letscher
*Attorney, Agent, or Firm*—Edward P. Heller, III; Raghunath S. Minisandram

[57] ABSTRACT

A spindle motor assembly adapted for rotationally supporting a load about a base includes a rotor rotatably mounted on the base with its outer periphery capable of supporting a load, a stator and a plurality of magnets mounted on the outer periphery of the rotor. The stator includes a plurality of stator laminations with selective portions of the stator laminations forming stator cores. A plurality of magnets are mounted on the outer periphery of the rotor in an operating relationship with the stator cores. A plurality of conductors are wound on the stator cores. The stator includes a resilient covering located around the plurality of laminations and further having a routing means to route the conductors between the stator cores, an attaching means to attach the stator to the base and a connecting means. The connecting means includes a first connector block with a plurality of first conductor pads, with a first end and a second end. Ends of the conductors are connected to the first end of the conductor pads. A second connector block is mounted on the base, with the second connector block having a plurality of second conductor pads. The second end of the first conductor pads are connected to the second conductor pads of the second connector block.

1 Claim, 8 Drawing Sheets

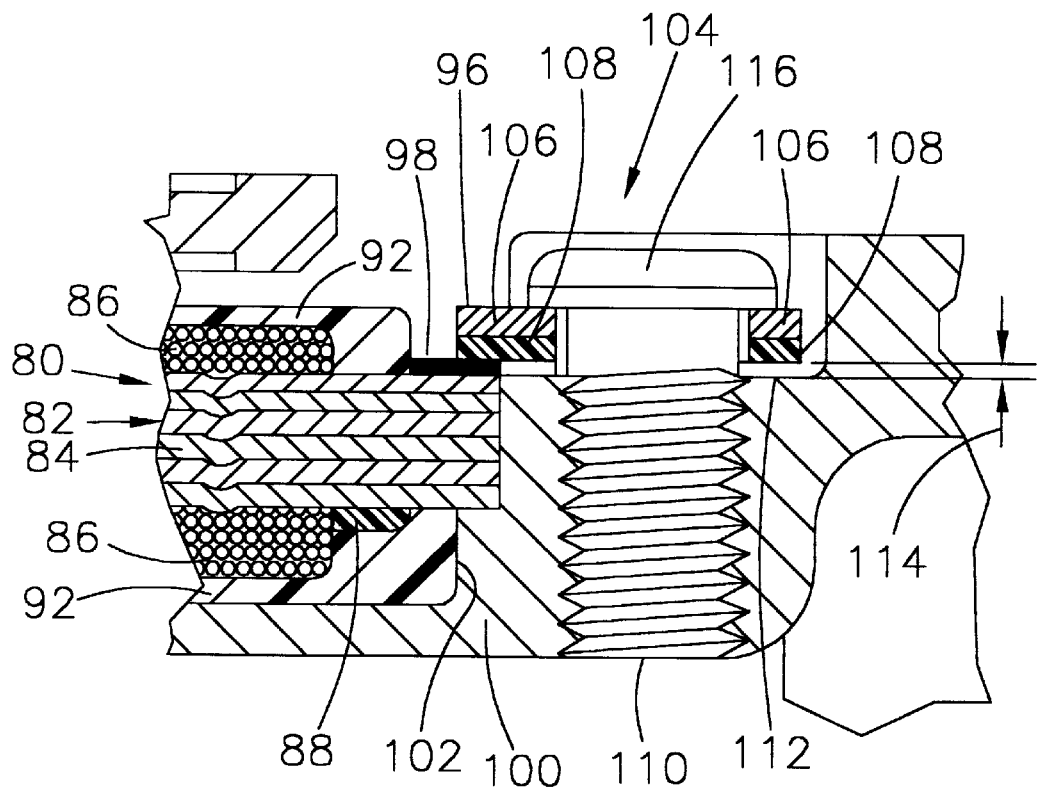
(PRIOR ART) FIG. 2
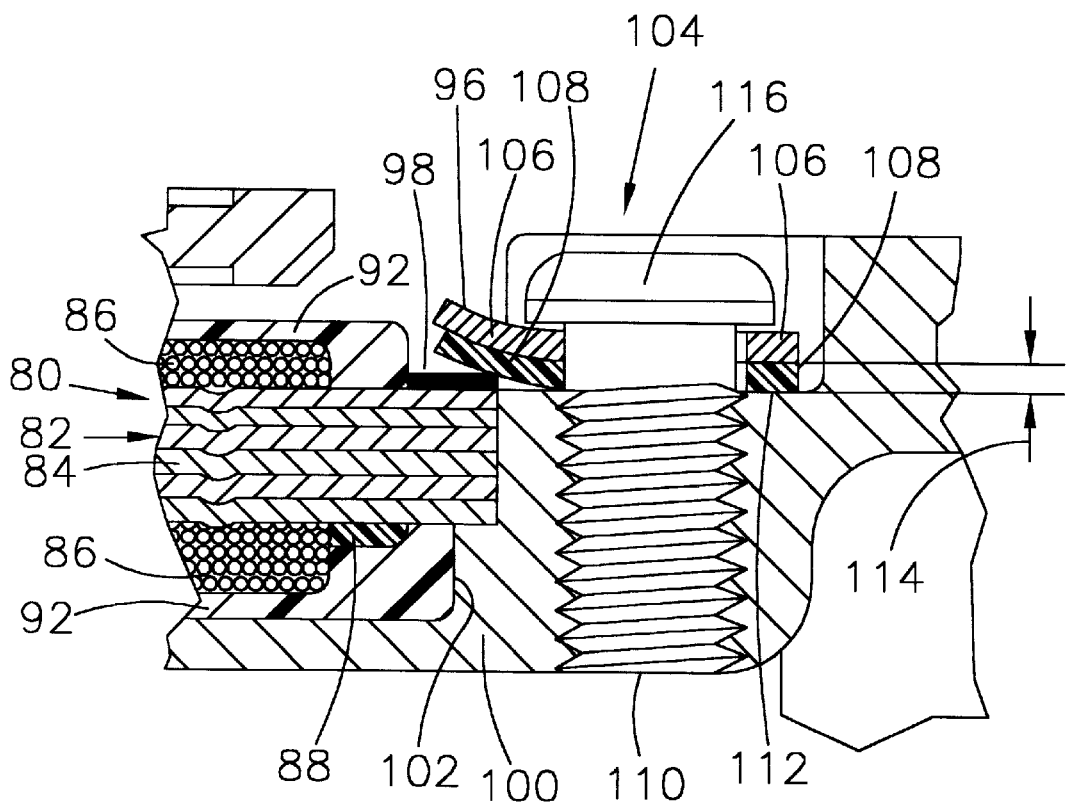
(PRIOR ART) FIG. 3

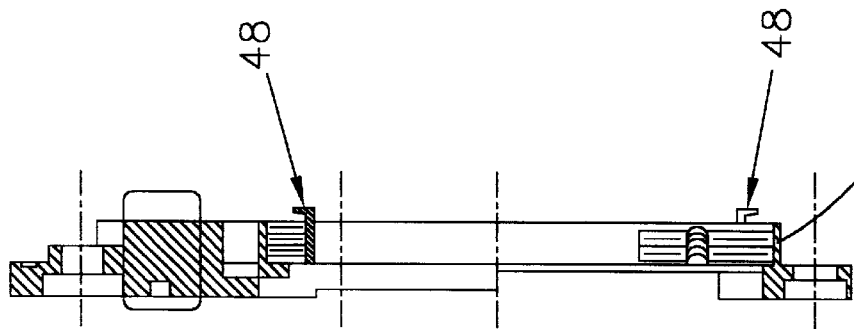
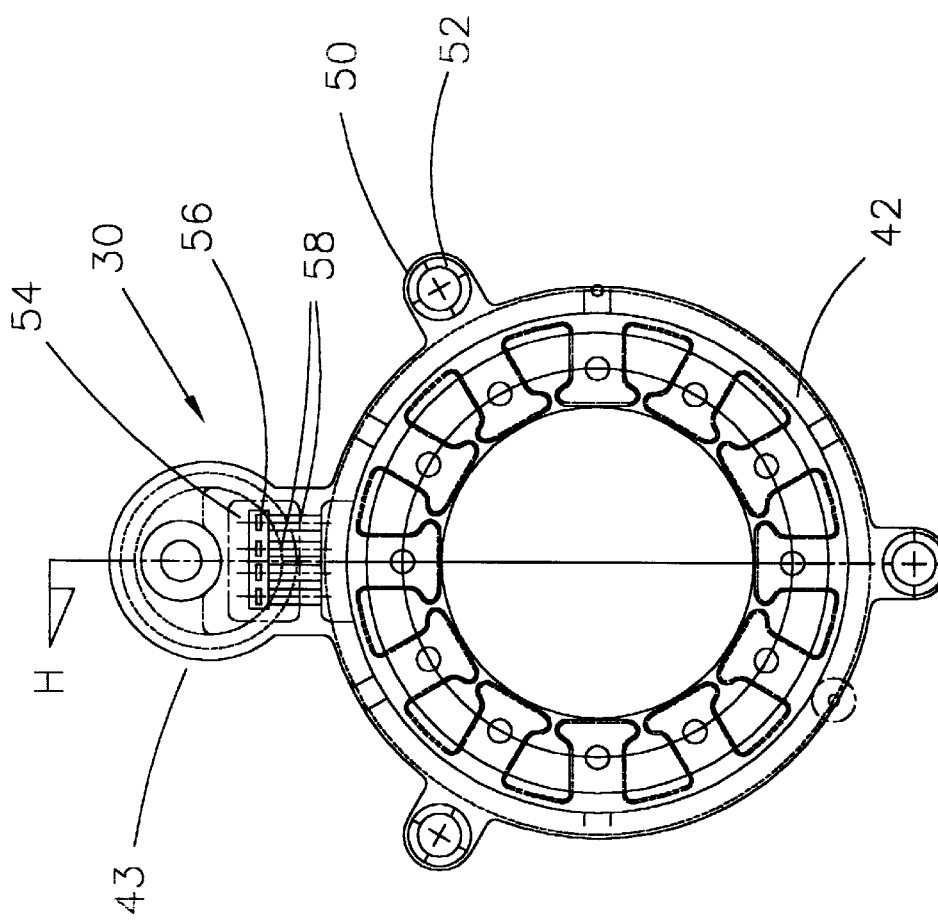

Detail E

DISK DRIVE SPINDLE MOTOR ASSEMBLY WITH STATOR HAVING A RESILIENT COVERING WITH A ROUTING MEANS, AN ATTACHING MEANS AND A CONNECTING MEANS TO OPERATIVELY CONNECT STATOR TO A BASE

This application claims the benefit of provisional application no. 60/008,750 filed on Dec. 18, 1995, entitled Disc Clamp and Spacer.

BACKGROUND OF THE INVENTION

This invention relates to disc drive spindle assemblies, and more particularly, to a disc drive spindle assembly which can be fabricated easily and assembled without the use of adhesives.

In a co-pending U.S. patent application Ser. No. 08/286,287 filed Aug. 5, 1994 for Adhesiveless Disc Drive Spindle Assembly, by Macleod et. al (hereinafter Macleod application), assigned to Seagate Technology, discloses a novel overmolded stator assembly, the teachings of which are fully incorporated herein by reference. FIG. 1 shows a plan view of a disc drive base and a stator assembly showing the stator clamping arrangement of the Macleod disclosure which is reproduced here. FIG. 2 shows an enlarged cross sectional view of the stator clamping mechanism of the Macleod disclosure. FIG. 3 shows an enlarged cross sectional view of the stator clamping mechanism during tension of the clamp string, per Macleod disclosure while FIG. 4 shows an alternate clamp spring arrangement.

Now referring to FIG. 1, Magnet 78 is preferably polarized into eight separate polarization sectors, each sector occupying about 45° and having opposite polarity as adjacent sectors. Stator assembly 80 preferably includes twelve radially positioned electromagnets 82. Electromagnets 82 include core 84 made of six sheets of laminated iron and wrapped with coil 86 of wire. Any exposed surface of core 84 is sealed with coating 98 to reduce corrosion. Plastic bobbin 88 is shown and is helpful in winding coils 86 about cores 84. Current is provided to coil 86 through flexible printed circuit (not shown). While electromagnets 82 are usually spaced equidistant form each other and spaced as closely as possible to magnet 46 to provide a uniformly reversing magnetic field as strong as possible with the least possible current. FIG. 1 further shows electromagnets 82 encased in overmold 92. Overmold 92 is preferably a plastic material, a bulk molding compound of thermoset molding material based on unsaturated polyester resin and containing inorganic fillers such as calcium carbonate, aluminum trihydrate and chopped short glass fiber. Overmold 92 encloses coil 86 and securely holds the wires in place to prevent movement of coil wires during motor operation and apparently helping to eliminate acoustic noise.

As best shown in FIGS. 1–3, stator 80 is retained in stator bed 102 of base 100 by three fastener assemblies 104. Stator bed 102 is shaped to prevent radial movement of stator 80. Fastener assembly 104 includes clamp spring 106, clamp washer 108 and fastener 110, which attaches to flange surface 112 of base 100. Clamp spring 106 is preferably made of flat stainless steel, and during bending acts as a spring. Fastener 110 is preferably a screw threaded fastener to provide ease of upward and downward adjustment. As shown in FIGS. 2 and 3, flange surface 112 is slightly below clamping surface 96 of stator 80, providing an offset 114. Clamping surface 96 may be the surface of coating 98 (as shown), or another surface such as that of core 84, coil 86 or overmold 92. As depicted alternatively in FIGS. 1 and 6, fastener assembly 104 may be used either with or without use of an overmold on stator 80.

In the Macleod application, the operation of fastener assembly 104 is as follows. As shown in FIG. 2, clamp spring 106 originally has a planar surface which covers offset 114. As fastener 110 is tightened down (FIG. 3), head 110 of fastener 110 begins to bend clamp spring 106 due to offset 114. The clamping force provided by clamp spring 106 on stator surface 96 is dependent on the amount of bending of clamp spring 106. Clamp spring 106 is configured such that a designated amount of bending (e.g., preferably an amount between 10 and 30°, such that a slight gap 115 is left between head 110 and the far edge of clamp spring 106 after tightening) will provide a proper securing for stator 80 under load conditions. The function of clamp washer 108 is to prevent any damage to coating 98 or core 84 caused by clamp spring 106 as fastener 110 is tightened down. Accordingly, clamp washer 108 may be made from a soft cloth-like or elastic material, but is preferably plastic or MYLAR.

FIG. 4 shows a plan view of an alternative clamp spring band 118 for use in fastening stator 80 to base plate 100. Rather than using three separate clamp springs 106, this singular clamp spring band 118 has band 120 which extends approximately 270° around stator 80 and holds together three clamp spring portions 122. The larger C-shaped clamp spring band 118 has three fastener locations 124 and thus can be used identically as three individual clamp springs 106 to clamp stator 80 in place.

The overmold stator assembly of Macleod disclosure uses a coating 98 on exposed surface of core 84 to avoid corrosion while plastic bobbin 88 is used to wind the coils 86 about cores 84 and route the wires of the coils 86 from one core to another. Once the coils 86 are wound, the electromagnets 82 are encased in overmold 92. Further, the fastener assembly of Macleod disclosure requires plurality of clamp springs 106, clamp washer 108 and a fastener 110. In addition, the current is provided to the coil 86 using a printed circuit. There is a need to reduce the number of parts required to assemble a stator assembly. There is a need to reduce the number of parts to fasten a stator assembly to the base. There is also a need to reduce the number of manufacturing steps required to assemble a stator assembly and fasten the stator assembly to the base. There is also a need to reduce the length or the presence of the flexible printed circuit so that any adverse electrical or magnetic effects of current flowing through the printed circuit to the coils can be reduced or eliminated.

SUMMARY OF THE INVENTION

It is the object of the invention to provide a spindle motor assembly adapted for rotationally supporting a load about a base, the spindle motor assembly comprising a rotor rotatably mounted on the base, the rotor having an outer periphery capable of supporting the load and a stator having plurality of stator laminations with selective portions of the stator laminations forming stator cores. Plurality of magnets are mounted on the outer periphery of the rotor in an operating relationship with the stator cores. A resilient covering located around the plurality of laminations further having a routing means, an attaching means and a connecting means. The routing means have plurality of projections. Plurality of conductors are wound on the stator cores and are routed between stator cores using the routing means. The connecting means includes a first connector block with plurality of first conductor pads. Ends of the conductors are connected to these first conductor pads. The attaching means is used to attach the stator to the base.

The routing means further includes plurality of projections so that the conductors can be routed between stator cores around the projections. The connecting means further includes plurality of eyelets to receive fasteners that connect the stator to the base.

In a specific embodiment of the invention, the spindle motor assembly further including a second connector block mounted on the base. The second connector block having plurality of second conductor pads. Further, plurality of first conductor pads of the first connector block having a first end and a second end, the first end of the first conductor pads connected to conductor and the second end of said first conductor pads connected to the second conductor pads of the second connector block.

BRIEF DESCRIPTION OF THE DRAWINGS

FIG. 2 is a prior art stator clamping mechanism.

FIG. 3 is a prior art stator clamping mechanism during tensioning.

FIGS. 8a and 8b are the plan and sectional elevation views respectively, showing the top side of the stator.

DETAILED DESCRIPTIONS

As is generally known in the art, the illustrative disc drive unit 10 includes a head positioner assembly (not shown) mounted within the housing base 10 at a position along the disc stack (not shown). The head positioner assembly supports a plurality of individual arms having electro-magnetic heads at the distal ends there of in close proximity with respective upper and lower surfaces on the disks. A suitable actuator motor (not shown) such as a movable coil DC motor, and a corresponding motor controller function to displace the head through generally radial traverses relative to the discs, for the purposes of reading and writing data, all in a well known manner.

Figure 1:
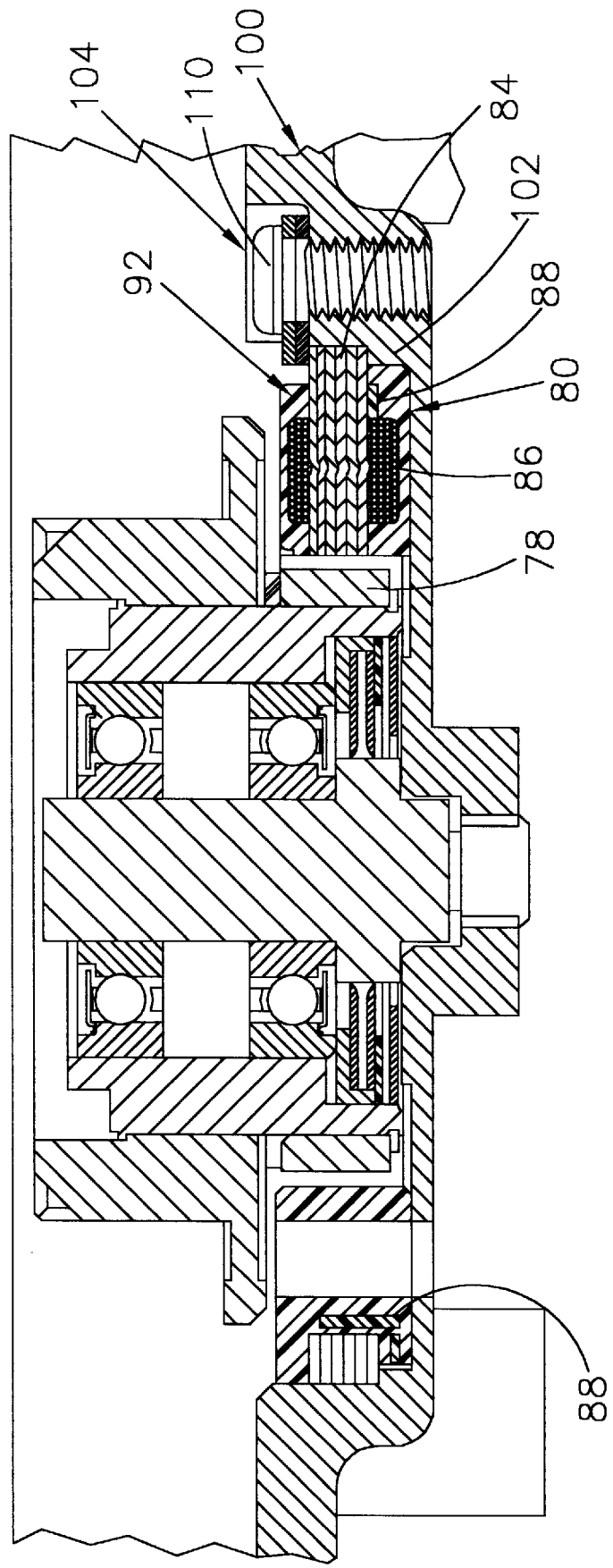
FIG. 1 is an enlarged cross sectional view of a prior art disk drive showing a prior art stator assembly.
Figure 4:
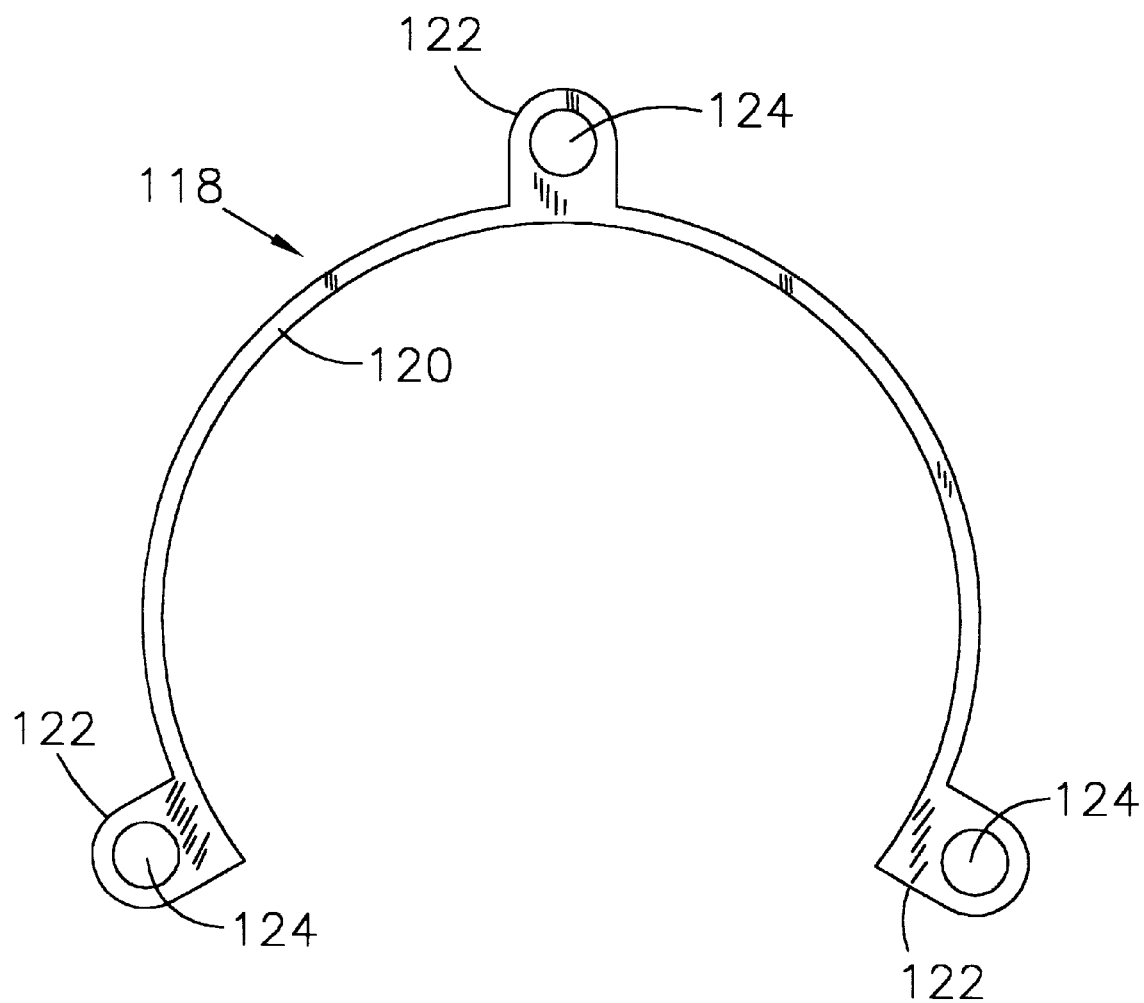
FIG. 4 is a prior art alternate clamping mechanism.
Figure 5:
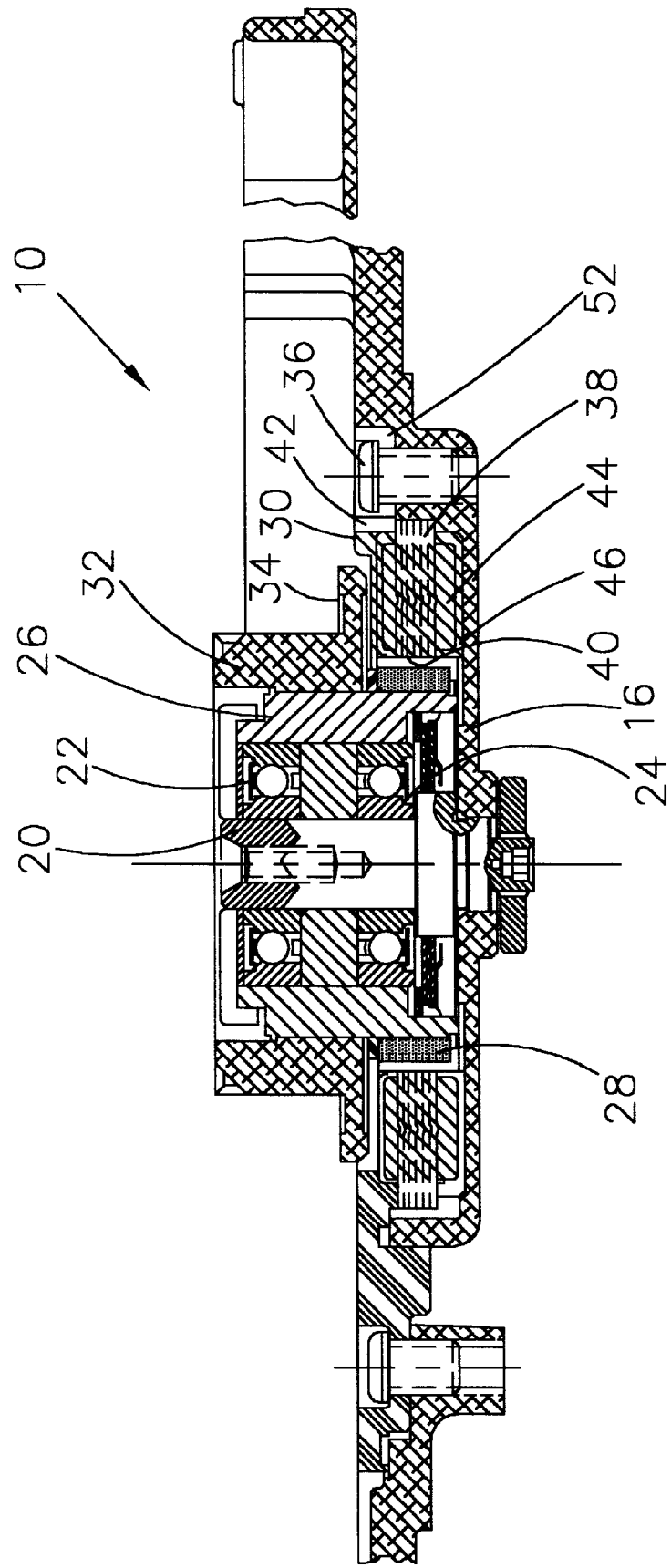
FIG. 5 is an exploded fragmented elevational sectional view through a disc drive unit showing an assembly of spindle motor of the present invention.

With reference to FIG. 5, a central shaft 20 is securely fixed to a portion of the housing base 10. The Central shaft 20 is also attached to the inner races of upper bearing 22 and lower bearing 24. The outer race of the upper bearing 22 and the outer race of the lower bearing 24 support a generally cylindrical hub core 26 constituting the rotor of the spindle motor. The outer periphery of the hub core 26 supports, at its lower end, a plurality of permanent magnets 28 which interact with a novel stator 30 of the present invention, to rotate the hub core 26 about the center shaft 20 in a known manner. The structure and features of the novel stator 30 will be explained in detail with references to additional figures. The outer periphery of the hub core 26 also supports a cylindrical hub 32 with a hub flange 34 so that disks and spacers could be alternatively stacked on the hub flange 32. The stator 30 is attached to the housing 10 base using plurality of fasteners 36.

The novel stator 30 further includes plurality of stator laminations 38 with stator cores 40. The stator laminations 38 are covered by a resilient covering 42. The stator coils 44 are wound on the covered stator cores. The wound stator cores are covered by an overmold 46 so that the wound stator coils are encapsulated by the overmold 46.

Figure 6:
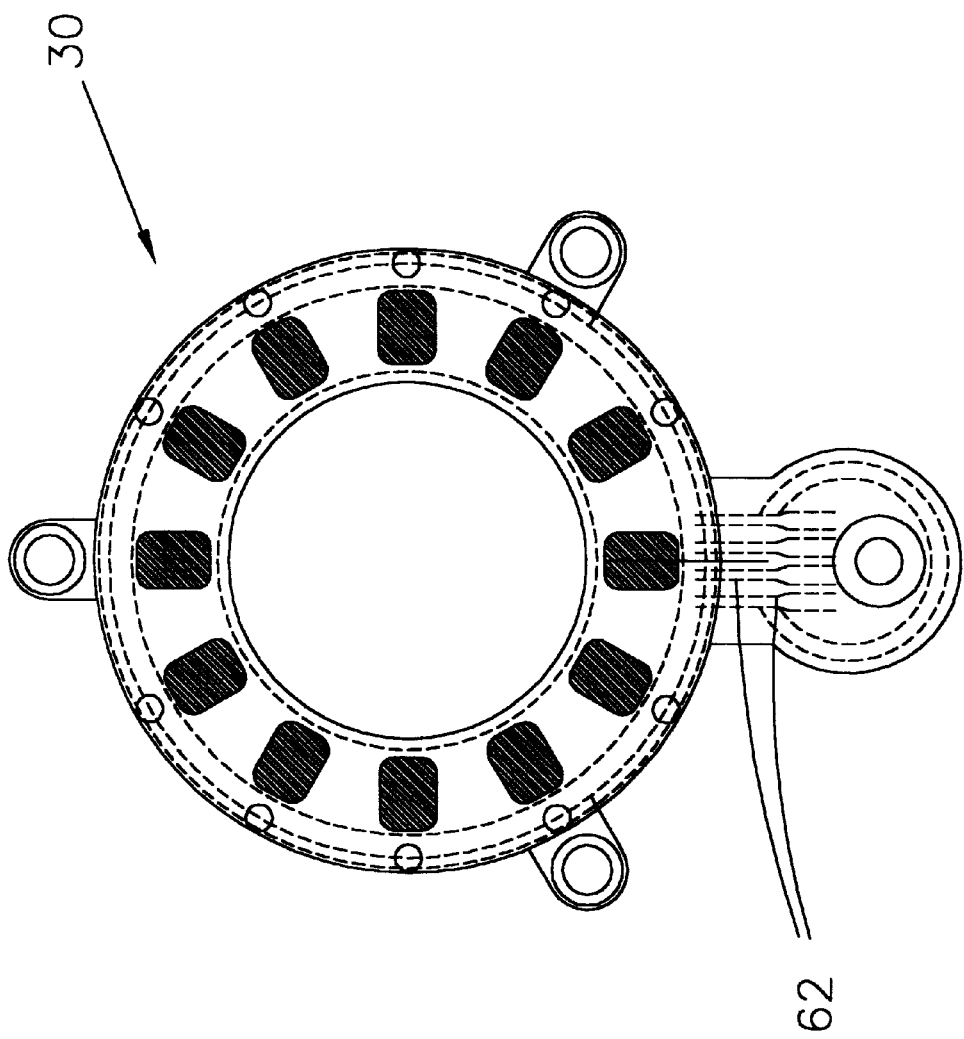
FIG. 6 shows topside of a fully fabricated stator 30 of the present invention.

FIG. 6 shows plurality of first conductor pads 62 located on the topside of the stator 30 and encapsulated by the overmold. In the preferred embodiment, there are four conductors so that the ends of the conductors forming the three phases are connected to three conductor pads while the common tap is connected to the fourth conductor pad, at the first end.

Figure 7:
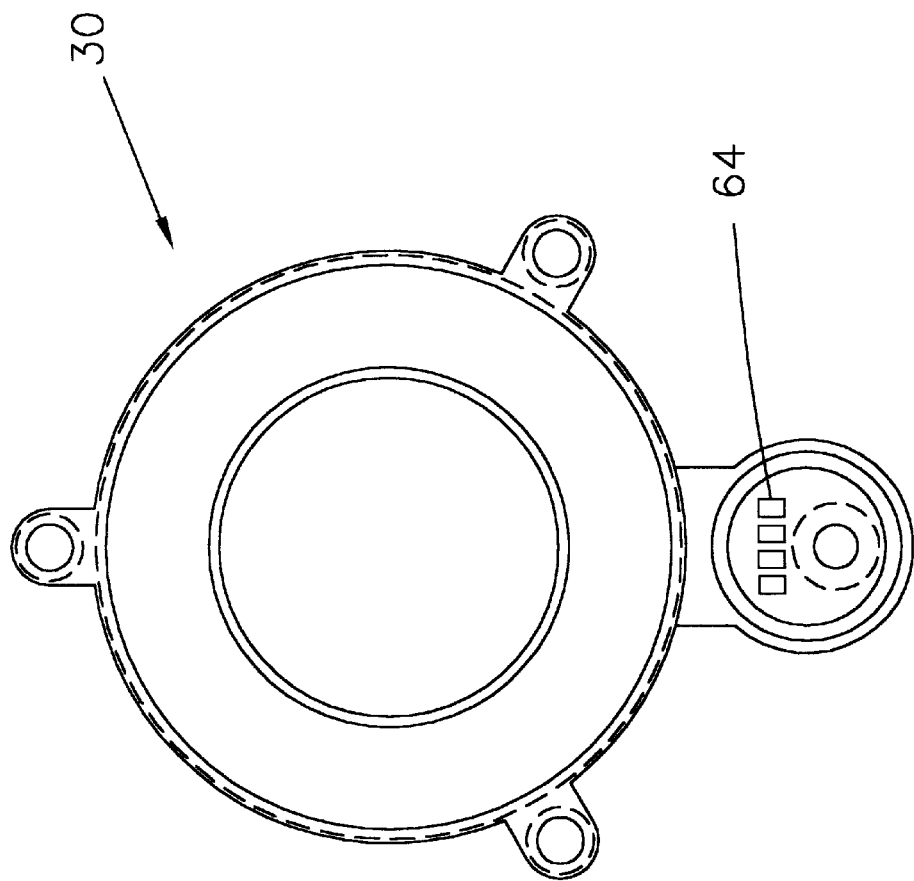
FIG. 7 shows bottom side of a fully of a fully fabricated stator 30 of the present invention.

FIG. 7 shows the second end of the first conductor pads, on the bottom side of the stator. As it can be seen, the second end 64 of the first conductor pad is not encapsulated by the overmold so that the second end of the first conductor pads could mate for example with a second connector block preferably mounted on the base (not shown in figure), with plurality of second conductor pads complementary to said second end of the first conductor pads.

FIG. 8a is a plan view of the stator, showing the topside of the stator. FIG. 8b is a sectional elevational view of the stator along the line H—H.

FIG. 8 shows the stator laminations covered with a resilient covering 42 of the current invention with a routing means, an attaching means and a connecting means of the current invention. In the preferred embodiment, the resilient covering is made of liquid crystal polymer with an added filler and the covering is preferably molded such that substantially all of the stator laminations are enclosed by the resilient covering. The filler could be mineral or glass fiber, providing stability and manufacturability.

The routing means includes plurality of projections 48 which are formed on the bottom side of the stator 30 and between the stator cores so that conductors wound on a stator core could be routed around the projections to another stator core. In the configuration of the stator cores shown, three conductors (not shown here) are used to wind the coils on the stator cores and the same conductor is used to wind every third stator core, to form a 3 phase motor.

The attaching means includes plurality of eyelets 50 which are formed by the resilient covering, around the outer periphery of the resilient covering and near the top of the stator 30 so that the stator 30 could be connected to the base 10 using plurality of fasteners. The eyelets 50 further having a countersunk hole 52 so that head of the fastener 36 can preferably be fully accommodated inside the countersunk hole 52, when the fastener 36 is tightened. The eyelets extend for about half way from the top side to the bottom side of the resilient covering, so that portions of the resilient covering and the stator laminations will be inside the stator receiving bore in the base when the eyelets rest on the base.

The connecting means consists of a first connector block 54 with plurality of through holes 56 to allow passage of conductors from top side to the bottom side. The first connector block is located around the periphery of the stator and away from the stator poles, in a cantilever position. By positioning the first connector block 54 away from the stator cores enables a coil winding apparatus an unrestricted access to the stator cores so that conductors could be wound on the stator cores and routed between stator cores along projections 48. The FIG. 8 further shows a first set of channels 58 for locating the first end of the first conductor pads. The first connector block 54 is partially assembled as a separate unit and can be snap fit into connector block receiving portion 43 of the resilient covering 42.

Figures 9, 9A, 9B:
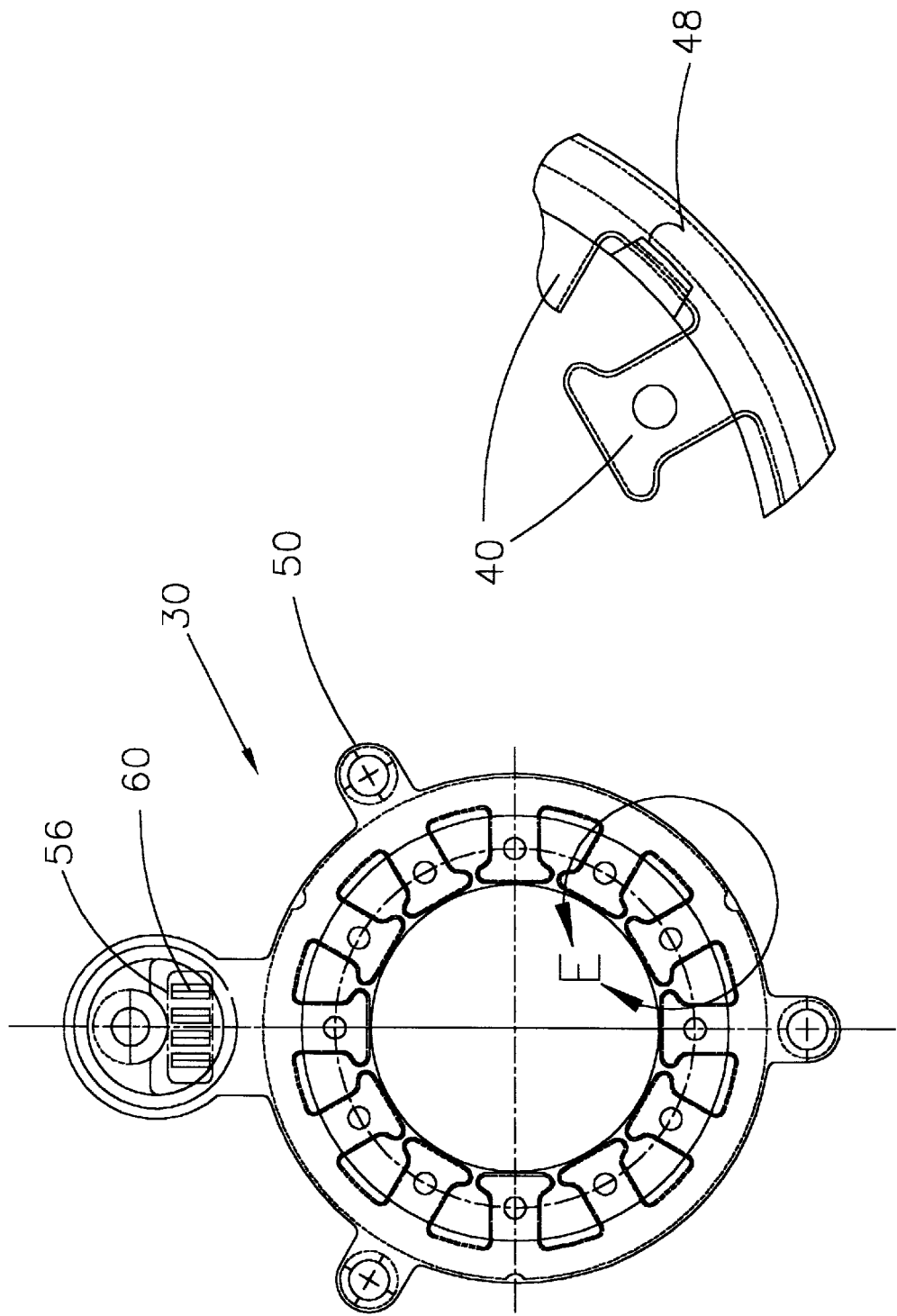
FIGS. 9a and 9b are the plan and fractional detail views respectively, showing the bottom side of the stator.

FIG. 9 shows plan and fractional detail views respectively, showing the bottom side of the stator 30. Specifically, FIG. 9 shows throughholes 56 and a set of elevated pads 60 to locate the second end of the first conduct or pads. The detail of FIG. 9b specifically shows the projection 48 formed between the stator cores 40.

Although the present invention discloses a stator that is overmolded, a stator with novel features of the resilient covering can be used independently, without an overmold covering.

From the above description, it is apparent that many modifications and variations of the present invention are possible in light of the above teachings. It is therefore to be understood that, within the scope of the appended claims, the invention may be practiced otherwise than as specifically described hereinabove.

We claim:

1. A spindle motor assembly adapted for rotationally supporting a load about a base, the spindle motor assembly comprising:

a rotor rotatably mounted on the base, the rotor having an outer periphery capable of supporting the load;

a stator having;

a plurality of stator laminations, selective portions of said stator laminations forming stator cores;

a plurality of conductors wound on said stator cores;

a resilient covering having a routing means to route said conductors between said stator cores, an attaching means to attach said stator to said base and a connecting means including a first connector block with a plurality of first conductor pads, ends of said conductors connected to said first conductor pads, said resilient covering located around said plurality of laminations;

plurality of magnets mounted on said outer periphery of said rotor in an operating relationship with said stator cores; and a second connector block, said second connector block having a plurality of second conductor pads, said second connector block mounted on said base;

said plurality of first conductor pads having a first and second end, said first end of said first conductor pads connected to said conductor and said second end of said first conductor pads connected to said second conductor pads of said second connector block.

* * * * *